Dec. 21, 1965  R. C. BUELER  3,224,342
APPLICATION VALVE
Filed Jan. 17, 1964
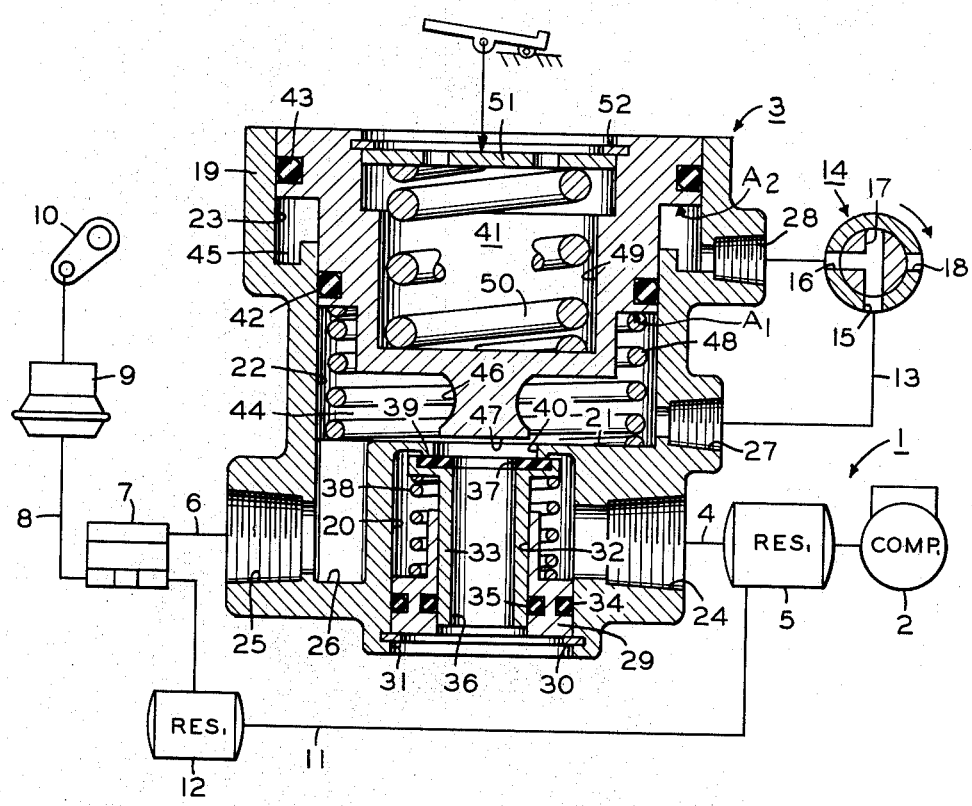
INVENTOR
RICHARD C. BUELER
BY
*Joseph E. Papin*

United States Patent Office 3,224,342
Patented Dec. 21, 1965

3,224,342
APPLICATION VALVE
Richard C. Bueler, Glendale, Mo., assignor to Wagner Electric Corporation, St. Louis, Mo., a corporation of Delaware
Filed Jan. 17, 1964, Ser. No. 338,367
9 Claims. (Cl. 91—434)

This invention relates to application valves for fluid pressure systems and in particular to ratio-changing application valves.

In the past, disadvantageous features effecting undesirable increases in vehicle air brake system sensitivity which, in most instances, deleteriously affected desirable air brake system controllability, i.e., the vehicle operator's ability to control the application valve treadle position and/or treadle force, have been a subject of interest and concern since precise braking controllability is essential to safe vehicle operation, and on larger commercial vehicles, such as tractors and/or trailers for instance, undesirable increases in sensitivity accutely affected braking controllability when such vehicles were operated substantially empty or without load. For example, the foundation brakes for such larger vehicles were necessarily designed to have a braking capacity great enough to adequately meet maximum braking demands or requirements when said vehicle was subjected to maximum loads, and as a resulting disadvantageous feature, said vehicle was greatly overbraked when empty or subjected to minimum loads which served to increase braking sensitivity and decrease braking controllability. Similarly, the suspension systems for such larger vehicles were necessarily designed to provide a satisfactory vehicle ride when subjected to maximum vehicle loads, and as another resulting disadvantageous feature, a rather stiff or sharp vehicle ride was provided in response to minimum vehicle loads which also tended to increase braking sensitivity and decrease braking controllability. In a large measure, the aforementioned disadvantageous features inherent to brake design and suspension design for larger vehicles were, in combination, responsible for the undesirable variations in braking controllability experienced as vehicle loads increased or decreased.

The past air application valves were generally designed to provide maximum performance for the vehicle operator at maximum vehicle loads which effected both maximum braking sensitivity and maximum braking controllability, and as a resulting disadvantageous feature, the performance of such application valves decreased in response to minimum vehicle loads. In other words, the disadvantageous features of braking design and suspension design, i.e., overbraking and stiff riding, contributed to braking sensitivity with a resulting decrease in braking controllability in response to minimum vehicle loads or braking loads to amplify or supplement the disadvantageous feature of the application valves, i.e., poorer or decreased performance. Increased braking sensitivity generally served to seriously impair the vehicle operator's ability to exercise the necessary precise control on the application valve and, therefore, decreased braking controllability or erratic vehicle braking resulted. In other words, as the vehicle or braking load decreased, the corresponding braking pressure required to effect proper or desirable vehicle deceleration and/or a complete stop also decreased, and the vehicle operator's ability to immediately adapt or adjust to the reduced application valve treadle reaction force accompanying such reduced braking pressure was generally insufficient to provide continuous and effective braking controllability and to prevent "overshooting" or applying more braking pressure than necessary to effect such desired vehicle deceleration. In this manner, increased braking sensitivity with a corresponding decreased braking controllability effected by the disadvantageous features of brake and suspension designs at minimum vehicle loads amplified or supplemented the disadvantageous feature of reduced application valve performance at minimum vehicle loads to accentuate the vehicle operator's inability to adjust to such conditions whereby any "overshooting" unintentionally effected by the vehicle operator served to immediately lock the vehicle brakes resulting in undesirable vehicle skidding and/or vehicle hopping.

Also in the past, application valves were employed in air brake systems in conjunction with ratio-relay valves, and an operator applied treadle force on said application valve metered fluid pressure from a source thereof to actuate said ratio-relay valve. The ratio-relay valve was responsive to the metered fluid pressure to apply fluid pressure from the aforementioned source or an auxiliary source to actuate a fluid pressure responsive motor for controlling energization of the vehicle brakes. Further, the ratio-relay valve was selectively operable to apply fluid pressure to the motor in a direct proportion or a ratio proportional to that metered thereto from the application valve. Another disadvantageous feature was that the operator was afforded a direct feel through the application valve only of the fluid pressure metered to the ratio-relay valve and was not necessarily afforded a direct feel as to the extent of the actual braking application. For instance, if the ratio-relay valve was selectively positioned to effect a ratio braking application, the operator could only feel the metered fluid pressure through the application valve while the fluid pressure actually applied by the ratio-relay valve to effect the braking application was less than the magnitude of the metered fluid pressure. Still another disadvantageous feature was that the applied fluid pressure from the ratio-relay valve could never attain the maximum value of the source connected therewith even though the operator metered full reservoir or source fluid pressure through the application valve to said ratio-relay valve when said ratio-relay valve was selectively positioned for a ratio braking application. For instance, under emergency conditions, it was instinctive for the operator to meter or dump full source fluid pressure to the ratio-relay valve, and if the operator had forgotten that the ratio-relay valve was selectively positioned for a ratio braking application, then the actual applied fluid pressure from said ratio-relay valve could never attain the magnitude of the fluid pressure metered to said ratio-relay valve from said application valve.

An object of the present invention is to provide an application valve which overcomes the aforementioned disadvantageous features.

Another object of the present invention is to provide an application valve in which the performance thereof is adjustable to minimize increased braking sensitivity and decreased braking controllability effected by the undesirable features of vehicle brake and suspension design.

Another object of the present invention is to provide an application valve having satisfactory operating characteristics to provide good braking sensitivity and controllability under both loaded and unloaded vehicle conditions.

Another object of the present invention is to provide an application valve in a vehicle fluid pressure system which is at all times operable to effect maximum energization of the vehicle brakes in accordance with the available maximum fluid pressure of said system.

Another object of the present invention is to provide a unitary application valve of compact and simplified construction which compatibly combines the application and ratio changing features or characteristics of separate application and ratio changing valves.

Another object of the present invention is to provide an application valve for a fluid pressure system which compatibly combines the application and ratio changing features or characteristics of separate application and ratio changing valves without appreciably increasing the inherent time lag of said system.

Still another object of the present invention is to provide a ratio changing application valve for a vehicle fluid pressure system which is responsive to selectively operable means to provide both a full or non-ratio braking effect and a reduced or ratio braking effect.

And still another object of the present invention is to provide a ratio changing application valve in which a direct feel or appraisal as to the extent of the braking application is afforded the operator during a full or non-ratio braking application and also during a reduced or ratio braking application.

These and other objects and advantages will become apparent hereinafter.

Briefly, the invention comprises an application valve in a fluid pressure system including manually controlled application means having a pair of reaction areas, said application means being movable in response to an operator applied force thereon to establish an output pressure acting on said reaction areas and provide a reaction force in opposition to said applied force, and means for disabling one of said reaction areas, said application means being further movable in response to the applied force thereon to effect a proportional increase in the output pressure acting on only the other of said reaction areas in opposition to the applied force.

The invention also consists in the parts and arrangement and combination of parts hereinafter described and claimed in the following specification, reference being had to the accompanying drawings which form a part of said specification wherein like numerals refer to like parts wherever they occur.

In the drawing which illustrates an embodiment of the invention, a diagrammatic view of a fluid pressure system is shown having a control valve therein in cross-section.

Referring now FIGURE 1 in detail, a fluid pressure system 1 is provided with a compressor 2 which is connected with an inlet port of an operator control or application valve 3 by a conduit 4 having a reservoir 5 interposed therein, said compressor and reservoir defining, in combination, a source of fluid pressure. Another conduit or service line 6 is interposed between an outlet port of the application valve 3 and the control portion of a relay valve 7 of the usual self-lapping type well known in the art and effective to apply fluid pressure in a direct proportion, i.e., 1:1, to that metered thereto, and another conduit 8 is connected between the outlet or delivery portion of said relay valve and a fluid pressure responsive motor or brake chamber 9 which is operatively linked with a slack adjuster 10 for controlling energization of a friction device or wheel brake assembly (not shown). The inlet portion of the relay valve 7 is connected with the reservoir 5 by a conduit 11, and another reservoir, such as an auxiliary reservoir 12, is interposed therein. To complete the system 1, another conduit 13 is connected between a pair of ratio or connecting ports which are provided in the application valve 3, and a two-way ratio or hand valve 14 is provided with connecting ports 15, 16 serially connected in the conduit 13. Rotatable passage means 17 normally provides open pressure fluid communication between the ratio ports of the control valve 3 through the conduit 13; however, said rotatable passage means may be rotated clockwise (in the direction of the arrow) to a position in the ratio valve 14 between the connecting port 16 and an exhaust 18 thereby interrupting pressure fluid communication between the ratio ports of the application valve 3 and venting one of said ratio ports to atmosphere.

The application valve 3 is provided with a housing 19 having a bore 20 therein defining a radial wall or partition 21 axially positioned between said bore and stepped counterbores 22, 23, said bore defining an inlet chamber in said housing. An inlet port 24 which receives the conduit 4, as previously mentioned, is provided in the housing 19 connecting with the bore 20, and an outlet port 25 which receives the conduit 6, as previously mentioned, is also provided in said housing being connected with the lower end of the counterbore 22 by a passage 26. Ratio or connecting ports 27, 28 which receive the conduit 13, as previously mentioned, are spaced in the housing 19 and respectively connected with counterbores 22, 23 adjacent the lower ends thereof.

A valve guide member 29 is positioned in the bore 20 against displacement by a snap ring and groove assembly 30 provided adjacent the lower end of said bore, and the lower end of said bore forms an exhaust port 31. The valve guide member 29 is provided with a bore 32 in which a valve element 33 is slidable, and seals 34, 35 are carried by said valve guide member in sealing engagement with the bore 20 and said valve element, respectively. The valve element 33 is provided with an axial bore or exhaust opening 36 therethrough and has an annular resilient sealing member or disc 37 on the upper end thereof in circumscribing relation with said exhaust opening. A spring 38 is biased between the valve element 33 and the valve guide member 29 normally urging the sealing disc 37 into engagement with a valve seat 39 which is formed on the housing wall 21 in circumscribing relation with a connecting passage 40 in said housing wall between the bore 20 and counterbore 22.

A stepped application or reaction piston 41 is slidably received in the counterbores 22, 23, and seals 42, 43 are carried in said reaction piston in sealing engagement with said counterbores. An outlet or reaction chamber 44 is defined in the counterbore 22 between the housing wall 21 and the reaction piston 41 in open pressure fluid communication with the outlet port 25 and the ratio port 27, and an annular ratio chamber 45 is defined between said piston and the side wall of the counterbore 23 and between the piston seal 43 and the shoulder formed between the stepped counterbores 22, 23, said ratio chamber being in open pressure fluid communication with the ratio port 28. An axial extension 46 is provided on the lower end of the piston 41 for movement through the connecting passage 40 in the housing wall 21, and a valve seat 47 is provided on the lower end of said extension for sealing engagement with the sealing disc 37 of the valve member 33. A return spring 48 is biased between the piston 41 and the housing wall 21 normally maintaining the valve seat 47 in predetermined spaced relation from the valve element 33. The effective or cross-sectional area $A_1$ of the reaction piston 41 in the outlet chamber 44 is substantially defined by the sealing area of the seal 42 in engagement with the counterbore 22 less, of course, the relatively small area of the reaction piston seat 47, and the effective area $A_2$ of said reaction piston in the ratio chamber 45 is substantially defined by the difference between the sealing area of the seal 43 engaged with the counterbore 23 and the sealing area of the seal 42 in engagement with the counterbore 22. The effective areas $A_1$ and $A_2$ are additive, and the effective area $A_1$, as shown for purposes of illustration, is greater than the effective area $A_2$.

To complete the description of the application valve 3, a stepped metering spring bore 49 is provided through the upper end of the piston 41, and a precompressed metering spring 50 is biased between the lower end wall of said metering spring bore and a retainer or treadle force receiving plate 51 slidable in said metering spring bore adjacent the upper end thereof, said plate being retained against displacement by a snap ring and groove assembly 52 provided in the upper end of said metering spring bore.

In the operation, assume that the component parts of the application valve 3 are positioned as above described and that the passage means 17 of the ratio valve 14 is positioned connecting the ratio ports 27, 28 of the control valve 3 in open pressure fluid communication through the conduit 13 to effect a reduced or ratio braking application, such as for instance when the vehicle is empty or subjected to minimum load conditions. A manually applied treadle force $M_r$ by the operator on the force receiving plate 51 of the piston 41 moves said piston downwardly in the counterbores 22, 23 against the return spring 48 to sealably engage the extension valve seat 47 with the valve element 33 thereby closing the exhaust passage 36 and isolating the outlet and ratio chambers 44, 45 from the atmosphere. Further, downward movement of the piston 41 disengages the valve element 33 from the valve seat 39 on the housing wall 21 to establish pressure fluid communication between the inlet and outlet ports 24, 25. The established or output fluid pressure $P_r$ flows from the reservoir 5 through the conduit 4, the inlet port 24, the inlet chamber 20, the connecting passage 40, the outlet chamber 44 and passage 26 into the outlet port 25 and therefrom through the service line 6 to controllably actuate the relay valve 7. The relay valve 7 is responsive to the fluid pressure $P_r$ metered thereto by the application valve 3 to effect the application of fluid pressure from the reservoir 12 through the conduit 11 to the conduit 8 to actuate the brake chamber 9 which, in turn, rotates the slack adjuster 10 to energize the wheel brake assembly associated therewith (not shown). As previously noted, the relay valve 7 is of the type well known to the art wherein the magnitude of the output or applied fluid pressure therefrom is substantially equal to the fluid pressure $P_r$ controllably metered thereto by the application valve 3. At the same time, the fluid pressure $P_r$ also flows from the outlet chamber 44 of the application valve 3 through the ratio port 27, the conduit 13 and the ratio valve 14, and the ratio port 28 into the ratio chamber 45. The fluid presure $P_r$ so established in the outlet and ratio chambers 44, 45 acts on the additive effective areas $A_1$ and $A_2$ of the reaction piston 41 therein creating a reaction force $F_r$ substantially equal to and in opposition to the manually applied force $M_r$ on said reaction piston, i.e., $M_r = F_r = P_r(A_1 + A_2)$.

When the reaction force $F_r$ equals the manually applied force $M_r$, the reaction piston 41 is moved upwardly against the metering spring 50 wherein the valve element 33 is positioned in lapped engagement with the housing valve seat 39 and the reaction piston valve seat 47 is positioned in lapped engagement with said valve element. The reaction force $F_r$ acting through the metering spring 50 against the manually applied force $M_r$ on the plate 51 affords the operator a direct and accurate "feel" as to the extent of the braking effort or application. If greater braking effort is desired, the manually applied force $M_r$ is increased and the component parts of the application valve 3 and system 1 function in the same manner as previously described to again move the component parts of said application valve to their lapped positions.

When the desired braking effort is attained, the manually applied force $M_r$ is removed from the reaction piston 41, and the return spring 48 and the reaction force $F_r$ moves said reaction piston upwardly to its original or inoperative position; therefore, the valve return spring 38 also moves the valve element 33 upwardly to its original position. Initially, this upward movement sealably re-engages the valve element 33 with the housing valve seat 39 to again interrupt pressure fluid communication between the inlet and outlet ports 24, 25, and further upward movement of the reaction piston 41 disengages its seat 47 from said valve element to re-establish communication between the outlet and exhaust ports 25, 36 to exhaust the fluid pressure $P_r$ from the relay valve 7 through the service line 6, the outlet port and passage 25, 26, the outlet chamber 44, the connecting passage 40, the valve element exhaust opening 36 and said exhaust port to the atmosphere. The relay valve 7 is responsive to such pressure fluid exhaustion to again interrupt pressure fluid communication between the reservoir 12 and brake chamber 9 and vent the applied fluid pressure from the brake chamber 9 through the conduit 8 to atmosphere thereby deactuating said brake chamber and effecting de-energization of the wheel brake assembly associated therewith. At the same time, the fluid pressure $P_r$ is also exhausted from the ratio chamber 45 of the application valve 3 through the ratio port 28, the conduit 13 and ratio valve 14, and the ratio port 27 into the outlet chamber 44 and therefrom to atmosphere, as described. In this manner, exhaustion of the fluid pressure $P_r$ from the outlet and ratio chambers 44, 45 eliminates the reaction force $F_r$.

If the operator desires a full or non-ratio braking application, such as for instance, when the vehicle is carrying a relatively heavy load or maximum load, the operator rotates the rotatable passage means 17 of the hand valve 14 in a clockwise direction (in the direction of the directional arrow) to a position aligning the passage means 17 between the connection port 16 and the exhaust 18 thereof. In this manner, presure fluid communication between the ratio ports 27, 28 of the application valve 3 is interrupted, and the ratio chamber 45 is vented at amosphere through the ratio port 28, the conduit 13, and the outlet, passage means and exhaust 16, 17 and 18, respectively, of the ratio valve 14. A manually applied force M by the operator on the reaction piston 41 actuates the valve element 33 to meter an established or output fluid pressure P from the application valve to the relay valve 7 which, in turn, applies fluid pressure to actuate the brake chamber 9, as previously described. Since the ratio valve 14 is positioned to vent the ratio chamber 45 of the application valve 3 and the reaction piston effective area $A_2$ to atmosphere while also obviating pressure fluid flow to said ratio chamber from the outlet chamber 44, the fluid pressure P established in said outlet chamber acts only on the effective area $A_1$ of the reaction piston 41 to create a reaction force F substantially equal to and in opposition to the manually applied force M on said reaction piston, i.e., $M = F = P(A_1)$. The reaction force F also acts through the metering spring 50 against the manually applied force on the plate 51 to afford the operator a direct and accurate "feel" as to the extent of the non-ratio braking effort. It should be noted that the output pressure P is greater than the output pressure $P_r$ and in ratio therewith by the proportion of the reaction areas, $$\frac{A_1 + A_2}{A_1}$$

From the foregoing, it is apparent that the application valve 3 affords the operator a direct and accurate appraisal or "feel" as to the extent of both the non-ratio and ratio braking applications. In other words, the output fluid presures P and $P_r$ act on the effective areas $A_1$ and $A_1 + A_2$ of the reaction piston 41 to create reaction forces F and $F_r$ in direct opposition to the applied forces M and $M_r$ on said reaction piston, respectively.

It is apparent that the application valve 3 provides the operator with a greater treadle stroke while also providing an increased reaction area to enhance the performance characteristic thereof for controlling lighter output fluid pressures $P_r$ during a ratio-braking application. In other words, the increased performance of the application valve 3 for controlling relatively small output fluid pressures $P_r$ during a ratio braking application when the vehicle is empty or subjected to minimum loads counteracts the increased sensitivity of the braking system normally effected by overbraking and stiff riding at minimum vehicle loads.

It is now apparent that a novel system and application valve meeting the objects set out hereinbefore are provided and that changes and modifications as to the precise configurations, shapes and details set forth in the disclosure by way of illustration may be made by those skilled in the art without departing from the spirit of the invention as defined by the claims which follow.

The embodiments of the invention in which an exclusive property or privilege is claimed are defined as follows:

1. In a fluid pressure system comprising a fluid pressure source and a fluid pressure responsive motor, an application valve for controlling the application of fluid pressure from said source to said motor including manually controlled application means, said application means being movable in response to a manually applied force thereon to effect the application of fluid pressure from said source to said motor, a pair of reaction areas on said application means and responsive to applied fluid pressure acting thereon to oppose the manually applied force, and means for selectively subjecting one of said reaction areas to atmosphere, said application means being movable in response to the manually applied force when said one reaction area is subjected to atmosphere to effect the application of a proportionally increased fluid pressure to said motor acting on only the other of said reaction areas in opposition to the manually applied force.

2. In a fluid pressure system comprising a fluid pressure source and a fluid pressure responsive motor, an application valve for controlling the application of fluid pressure from said source to said motor including manually controlled application means, a pair of separate reaction areas on said application means, said application means being movable in response to a manually applied force thereon to effect the application of fluid pressure from said source to said motor, and selectively operable means movable between one position for subjecting said reaction areas to applied fluid pressure and another position for subjecting one of said reaction areas to atmosphere, said reaction areas being responsive to the applied fluid pressure acting thereon when said selectively operable means is in the one position to oppose the manually applied force, and said application means being movable in response to the manually applied force thereon when said selective operable means is in the other position to effect the application of a proportionally increased fluid pressure to said motor acting on only the other of said reaction areas to oppose the manually applied force.

3. In a fluid pressure system comprising a fluid pressure source and a fluid pressure responsive motor, an application valve for controlling the application of fluid pressure from said source to said motor including manually controlled application means, said application means being movable in response to a manually applied force thereon to effect the application of fluid pressure from said source to said motor, a pair of reaction areas on said application means responsive to the magnitude of the applied fluid pressure to oppose the manually applied force, and means for selectively subjecting one of said reaction areas to atmosphere, said application means being movable in response to the applied force thereon when said one reaction area is subjected to atmosphere to effect the application of fluid pressure to said motor acting on only the other of said reaction areas and having a magnitude in a predetermined ratio with the magnitude of that applied to said motor acting on said one and other reaction areas.

4. In a fluid pressure system comprising a fluid pressure source and a fluid pressure responsive motor, an application valve including a pair of expansible pressure fluid chambers therein, manually controlled application means normally opposing expansion of said chambers and adapted to control pressure fluid communication between said source to said motor, said application means being movable in response to an applied force thereon to effect the application of fluid pressure from said source to said motor and into said chambers, the magnitude of the applied fluid pressure in said chambers acting on the effective areas of said application means therein to oppose the manually applied force, and means for selectively venting one of said chambers to the atmosphere, said application means being movable when said one chamber is vented to effect the application of pressure fluid to said motor and into only the other of said chambers acting on the effective area of said application means therein and having a magnitude in a predetermined ratio with the magnitude of that applied to said motor and into both of said chambers.

5. In a fluid pressure system comprising a fluid pressure source and a fluid pressure responsive motor, an application valve including means therein providing pressure fluid flow passage means for connecting said source with said motor, valve means normally closing said flow passage means, manually controlled application means for engagement with said valve means, said application means being movable in response to an applied force thereon to engage and move said valve means to a position effecting the application of fluid pressure from said source to said motor, a pair of separate reaction areas on said application means responsive to applied fluid pressure to oppose the manually applied force, selectively operable means for connecting one of said reaction areas with the atmosphere, said application means and valve means being movable to another position when said one reaction area is connected with the atmosphere to effect the application of a proportionally increased fluid pressure to said motor and acting on only the other of said reaction areas in opposition to the manually applied force.

6. An application valve for fluid pressure comprising a housing having inlet, outlet and exhaust ports therein, valve means controlling pressure fluid communication between said ports, manually controlled application means for engagement with said valve means, said application means being movable in response to a manually applied force thereon to engage and move said valve means to a position interrupting pressure fluid communication between said outlet and exhaust ports and establishing pressure fluid communication between said inlet and outlet ports, a ratio port in said housing adapted for selective connection in communication with said outlet port or the atmosphere, a pair of separate reaction areas on said application means and responsive to fluid pressure at said outlet and ratio ports, respectively, said reaction areas being responsive to the established fluid pressure at said outlet port to oppose the manually applied force when said ratio port is connected in communication with said outlet port, and said application means and valve means being movable to establish a proportionally increased fluid pressure at said outlet port acting on only one of said reaction areas when said ratio port is connected in communication with the atmosphere.

7. An application valve for fluid pressure comprising a housing having inlet, outlet and ratio chambers therein, valve means controlling pressure fluid communication between said inlet and outlet chambers, application means in said outlet and ratio chambers for engagement with said valve means, said application means being movable in response to a manually applied force thereon to engage and move said valve means to a position establishing pressure fluid communication between said inlet and outlet chambers, said ratio chamber being adapted for selective connection in communication with said outlet chamber or the atmosphere, said application means being responsive to the established fluid pressure in said outlet and ratio chambers when said ratio chamber is connected in communication with said outlet chamber to oppose the manually applied force thereon, and said application means and valve means being movable when said ratio chamber is connected in communication with the atmosphere to establish a fluid pressure acting on said application means in only said outlet chamber and having a magnitude in a predetermined ratio with that of the established fluid pressure acting on said application means in both said outlet and ratio chamber.

8. An application valve for fluid pressure comprising a housing having inlet, outlet and exhaust ports therein, valve means controlling pressure fluid communication between said ports, manually controlled reaction piston means slidable in said housing, said reaction piston means being movable in response to a manually applied force thereon to engage and move said valve means to a position interrupting pressure fluid communication between said outlet and exhaust ports and establishing pressure fluid communication between said inlet and outlet ports, said application means defining with said housing an outlet chamber connected with said outlet port and a separate ratio chamber, means including means for selectively connecting said ratio chamber in pressure fluid communication with said outlet chamber or with the atmosphere, a pair of reaction areas on said reaction piston means in said outlet and ratio chambers, respectively, said reaction areas being responsive to the established fluid pressure in said outlet and ratio chambers to oppose the manually applied force when said ratio chamber is connected in pressure fluid communication with said outlet chamber, and said application means and valve means being movable to another position when said ratio chamber is connected with the atmosphere to establish a fluid pressure acting on only the reaction area in said outlet chamber and having a magnitude in a predetermined ratio with that of the first established fluid pressure.

9. A self-lapping application valve for a fluid pressure system comprising a housing, a bore and a pair of aligned counterbores therein, passage means connecting said bore with one of said counterbores, an inlet port connected with said bore and an outlet port connected with said one counterbore, a first valve seat in said bore in circumscribing relation with said passage means, valve means normally urged into engagement with said first valve seat to interrupt pressure fluid communication between said inlet and outlet ports, an exhaust opening in said valve means normally communicating said outlet port with the atmosphere, a stepped reaction piston slidable in said pair of counterbores and defining therewith separate outlet and ratio chambers, said outlet chamber being connected in open pressure fluid communication with said outlet port, extension means on said reaction piston for movement through said passage means, a second valve seat on said extension means for engagement with said valve means about said exhaust opening, a pair of fluid pressure responsive reaction areas on said reaction piston on said outlet and ratio chambers, respectively, a pair of connecting ports in said housing, one of said connecting ports intersecting said one counterbore in open pressure fluid communication with said outlet chamber and the other of said connecting ports intersecting the other of said counterbores in open pressure fluid communication with said ratio chamber, a metering spring in said reaction piston, said reaction piston being initially movable in response to a manually applied force on said metering spring to engage said second valve seat with said valve member and close said exhaust opening to interrupt communication between said outlet port and the atmosphere, said reaction piston being further movable in response to the manually applied force to disengage said valve means from said first valve seat and establish pressure fluid communication between said inlet and outlet ports, means connected between said connecting ports including selectively operable means movable between one position connecting said connecting ports in open pressure fluid communicating and another position interrupting pressure fluid communication between said connecting ports and venting said other connecting port to the atmosphere, the magnitude of the established fluid pressure acting on both of said reaction areas when said selectively operable means is in the one position to move said reaction piston against said metering spring and the manually applied force to a position wherein said valve means is in lapped engagement with said first valve seat and said second valve means is in lapped engagement with said second valve seat, and said reaction piston and valve means being subsequently movable when said selectively operable means is moved to the other position to re-establish communication between said inlet and outlet ports or between said outlet port and the atmosphere to proportionally change the magnitude of the established fluid pressure acting on only the reaction area of said reaction piston in said outlet chamber in opposition to the manually applied force.

References Cited by the Examiner
UNITED STATES PATENTS

| | | | |
|---|---|---|---|
| 1,626,607 | 5/1927 | Fowler | 91—434 |
| 2,137,954 | 11/1938 | Sanford et al. | 91—434 |
| 3,076,441 | 2/1963 | Ayers | 91—434 |

SAMUEL LEVINE, *Primary Examiner.*

P. E. MASLOUSKY, *Assistant Examiner.*